United States Patent [19]
Stokes

[11] Patent Number: 5,220,955
[45] Date of Patent: Jun. 22, 1993

[54] HEAT EXCHANGE APPARATUS

[75] Inventor: Keith H. Stokes, Lancashire, England

[73] Assignee: Dunsley Heat Limited, Holmfirth, England

[21] Appl. No.: 834,333

[22] PCT Filed: Aug. 13, 1990

[86] PCT No.: PCT/GB90/01272

§ 371 Date: Feb. 12, 1992

§ 102(e) Date: Feb. 12, 1992

[87] PCT Pub. No.: WO91/02928

PCT Pub. Date: Mar. 7, 1991

[30] Foreign Application Priority Data

Aug. 12, 1989 [GB] United Kingdom ............... 8918446

[51] Int. Cl.$^5$ ..................... F24H 3/06; F24F 12/00; F04D 29/58
[52] U.S. Cl. ..................... 165/54; 165/122; 165/164; 165/909
[58] Field of Search ............. 165/54, 164, 122, 909

[56] References Cited

U.S. PATENT DOCUMENTS

| 1,799,039 | 3/1931 | Conejos | 165/119 |
| 2,768,508 | 10/1956 | Guyton | 165/148 |
| 3,854,530 | 12/1974 | Jouet et al. | 165/164 |
| 4,574,872 | 3/1986 | Yano et al. | 165/54 |
| 4,577,683 | 3/1986 | Kelch | 165/164 |
| 4,711,293 | 12/1987 | Niwa et al. | 165/54 |

FOREIGN PATENT DOCUMENTS

| 192212 | 8/1986 | European Pat. Off. . | |
| 180784 | 1/1907 | Fed. Rep. of Germany . | |
| 2556660 | 7/1976 | Fed. Rep. of Germany | 165/54 |
| 3006318 | 8/1981 | Fed. Rep. of Germany | 165/54 |
| 3643496 | 6/1988 | Fed. Rep. of Germany . | |
| 0015739 | 1/1984 | Japan | 154/54 |
| WO86/05579 | 9/1986 | PCT Int'l Appl. . | |
| 198234 | 9/1938 | Switzerland . | |
| 221714 | 12/1923 | United Kingdom . | |
| 433004 | 6/1934 | United Kingdom . | |
| 745914 | 3/1956 | United Kingdom . | |
| 778541 | 7/1957 | United Kingdom . | |
| 2076133A | 11/1981 | United Kingdom . | |
| 2140549A | 11/1984 | United Kingdom . | |

Primary Examiner—John K. Ford
Attorney, Agent, or Firm—Richard E. Jenkins

[57] ABSTRACT

Heat exchange apparatus comprises first and second heat exchange units 2, 4 with spiral pathways, each unit having a central volute which contains a respective impeller 18, 24. The pathways of each unit are separated by flexible metallic strips 14/15/16. The impellers are driven by a common motor 26 therebetween. The apparatus is intended for use in heat exchange between air streams, for example between an air stream extracted from a building and an air stream extracted from outside. Mixing of the air streams is prevented.

10 Claims, 4 Drawing Sheets

KEY:
⇒ INTAKE AIR
⇐ EXHAUST AIR
∼ HEAT EXCHANGE

HEAT EXCHANGE APPARATUS

This invention relates to heat exchange apparatus for exchanging heat between fluids. The heat exchange apparatus may, for example, find application as part of an air conditioning unit or a heat pump. The invention relates in particular to a compact heat exchange apparatus suitable for application as a room or car air conditioner/heater.

According to the present invention there is provided heat exchange apparatus, comprising a first heat exchange unit and a second heat exchange unit, each heat exchange unit having a fluid impeller and a heat conductive wall about the impeller, wherein each said unit has a first flow pathway, about the impeller, internally of the wall, and a second flow pathway, externally of the wall; the first and second units being so connected that the first flow pathway of the first unit communicates, via the impeller of the first unit, with the second flow pathway of the second unit; and the first flow pathway of the second unit communicates, via the impeller of the second unit, with the second flow pathway of the first unit.

Preferably the wall of each heat exchange unit is of spiral form thereby enclosing a volute within which the impeller is located. Preferably, the first pathway of each unit continues beyond the volute in a spiral conformation.

Suitably a second heat conductive wall of spiral shape is provided in each heat exchange unit, serving as the outer wall of the second flow pathway. Each heat exchange unit may thus comprise two flow pathways of spiral conformation, interleaved with each other, and isolated from each other by means of two heat conductive walls.

Fluid flow in the second pathway of each heat exchange unit is preferably in the spiral direction, though could, in certain embodiments, be in the axial direction.

The second flow pathway of each heat exchange unit may communicate with a transfer port located substantially at the innermost region of the pathway, the transfer port permitting fluid to enter or leave the pathway by flow in a direction which is transverse to the flow, in a spiral direction, within the pathway.

Preferably, in use, the fluid is moved in one sense along one pathway and in the opposite sense along an adjacent pathway, in each unit. Each unit may have two fluid pathways as described, or may have further such fluid pathways, each fluid pathway being separated from each adjacent pathway by a heat conductive wall.

Preferably, the heat conductive wall(s) is/are constituted by flexible strip(s), preferably of a metallic material. Preferably the metallic material is thin, suitably about 0.1–0.5 mm, so that its heat capacity is low, whereby the thermal lag of the heat exchange unit is low.

In a heat exchange apparatus as previously described, each said heat exchange unit comprises a fluid impeller, for example a centrifugal fan, located in its eye, suitably a volute. The fluid impellers are preferably driven by a common motor, suitably located between the impellers. In this way, a heat exchange unit in accordance with the invention may be compact, yet provide efficient heat transfer.

In a particularly compact heat exchange apparatus the first and second units are located together substantially in face-to-face contact, the first and second units defining respective hollows, which oppose each other but with a lateral offset from each other, wherein the units have partitioning between them, the arrangement being such that the communication between the second flow pathway of the first unit and the first flow pathway of the second unit is via a transfer port in the partitioning at the position at which the second hollow extends laterally beyond the first hollow, and via the impeller of the second unit; and the communication between the second flow pathway of the second unit and the first flow pathway of the first unit is via a transfer port in the partitioning at the position at which the first hollow extends laterally beyond the second hollow, and via the impeller of the first unit. Preferably, the second heat unit is arranged upside down relative to the first unit and the said hollows are axial continuations of respective volutes of the units, wherein each transfer port is aligned with a region of the volute of the other unit.

Heat exchange apparatus in accordance with the present invention is compact and efficient, and is particularly well suited for the exchange of heat between gaseous media, for example, air/air. It may be especially useful as an air conditioner/heater for use in a car or building, extracting air from the interior and bringing in air from the exterior; in winter extracting heat from the outgoing interior air and transferring it to the incoming exterior air, and in summer extracting heat from the incoming exterior air and transferring it to the outgoing interior air. In so doing, moreover, condensation problems are reduced, the interior air generally being moister then the exterior air. Efficient car or household heat exchange apparatus, comprising two heat exchange units, as previously described, may be a cube of size about 30 cm.

One embodiment of heat exchange apparatus in accordance with the present invention is through-wall heat exchange apparatus, exchanging heat between a car or room of a house, and the outside. In this context it may be desirable to employ an auxiliary heating device, conveniently an electric heating element, to increase the amount of heat which the unit can give to the incoming air. It may be desirable to provide an electric heating element in a distinct unit which is securable to the heat exchange apparatus, over the "inside outlet" thereof. For example, this might be useful if such a heat exchange apparatus were used to provide ventilation for a bathroom, heat being extracted from the exhaust air and steam and provided by the heating element.

Preferably there is provided, for use with heat exchange apparatus in accordance with the present invention, singly or in combination, one or more modules securable to the apparatus, for example a heater module as described above, a cooling module, a humidifying or dehumidifying module, an electrostatic filter module or a perfuming/room freshening module. Such modules may conveniently be securable over the "interior outlet" of the unit, for example replacing the standard fascia of the unit.

Heat exchange apparatus for use in a household context can be a main apparatus serving a number of rooms via ducting. In general the modules described above may be incorporated in the ducting or at the "interior outlets" of such a system. Heater or cooling modules, when provided, are preferably located at the "interior outlets".

In accordance with another aspect of the invention, therefore, there is provided heat exchange apparatus or a heat exchange unit, for heat exchange between air streams, in association with one or more modules securable thereto, to provide a qualitative change of the air in at least one of the air streams.

A heat exchange unit in accordance with the invention may find application in other areas, for example, as a high temperature heat exchanger, or as a heat pump.

In accordance with a further independent aspect of the invention there is provided a method of making a heat exchange unit for transferring heat from one flow pathway to another flow pathway the pathways being of spiral conformation, interleaved with each other, and separated from each other by a plurality of spaced-apart strips of a flexible material (preferably metallic), which method comprises providing a pair of spaced-apart side plates for the unit, each side plate having a plurality of spaced-apart spiral grooves, aligned with and facing corresponding grooves of the other side plate, each pair of aligned grooves serving as guides for the lateral edges of a strip; and feeding the strips into the grooves, lengthwise, to the extent permitted by the grooves.

The invention will now be described, by way of example, with reference to the accompanying drawings, in which.

Figure 4:
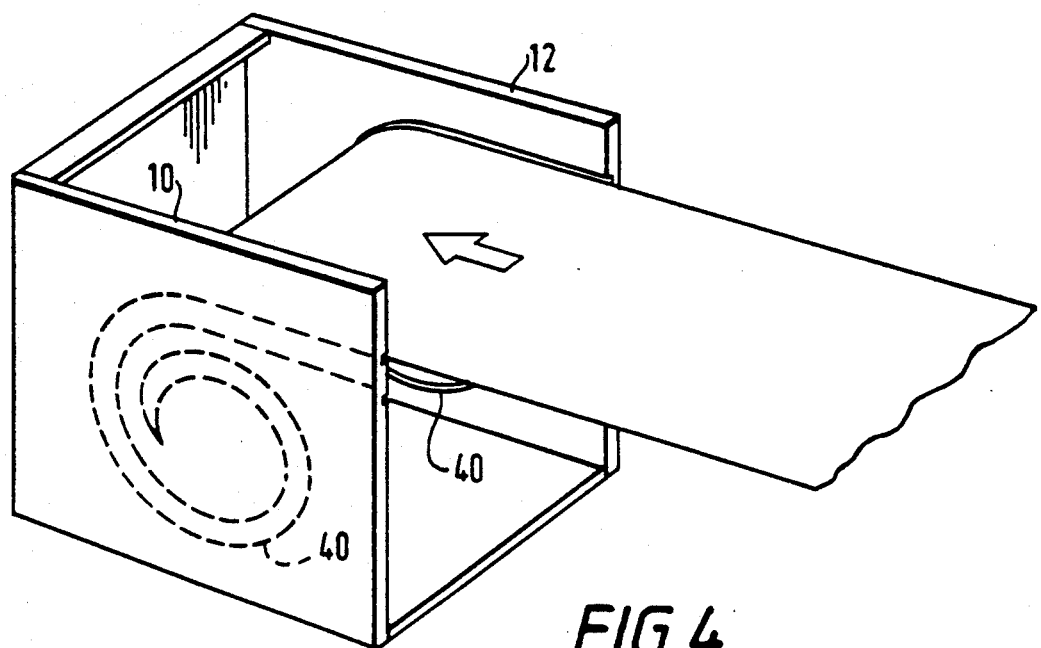
Figure 5:
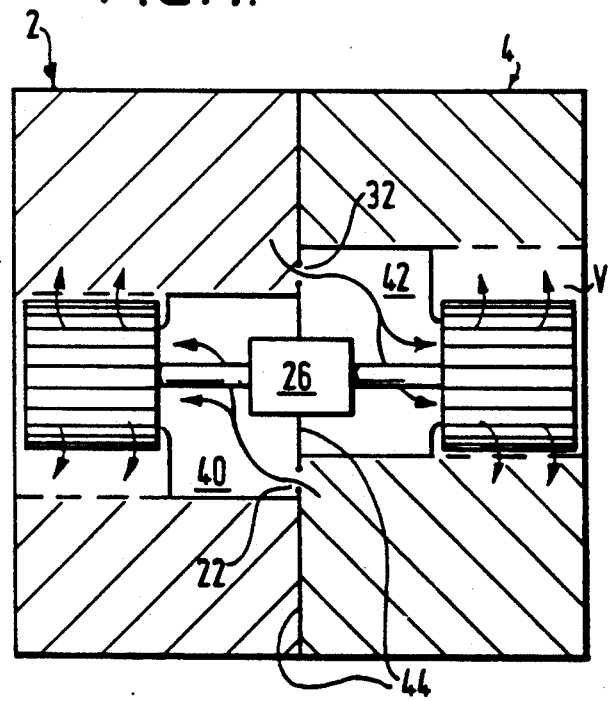
Figure 6:
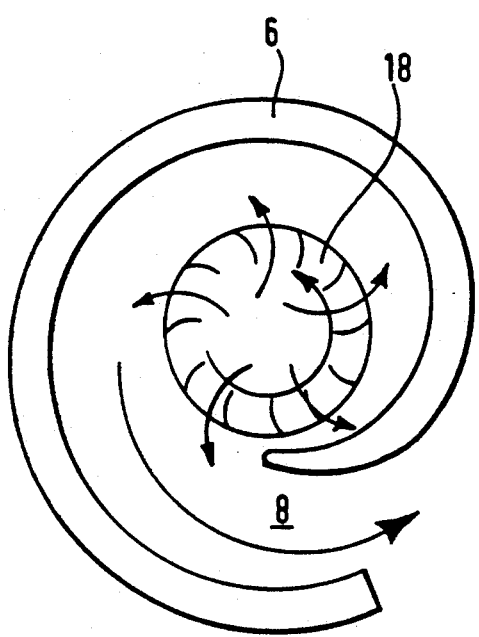

FIG. 4 demonstrates a step in a method of constructing heat exchange apparatus in accordance with the invention;

FIG. 5 shows in schematic cross-sectional view a further embodiment of heat exchange apparatus in accordance with the invention;

FIG. 6 shows, in schematic cross-sectional view, a further embodiment; and

Figure 8:
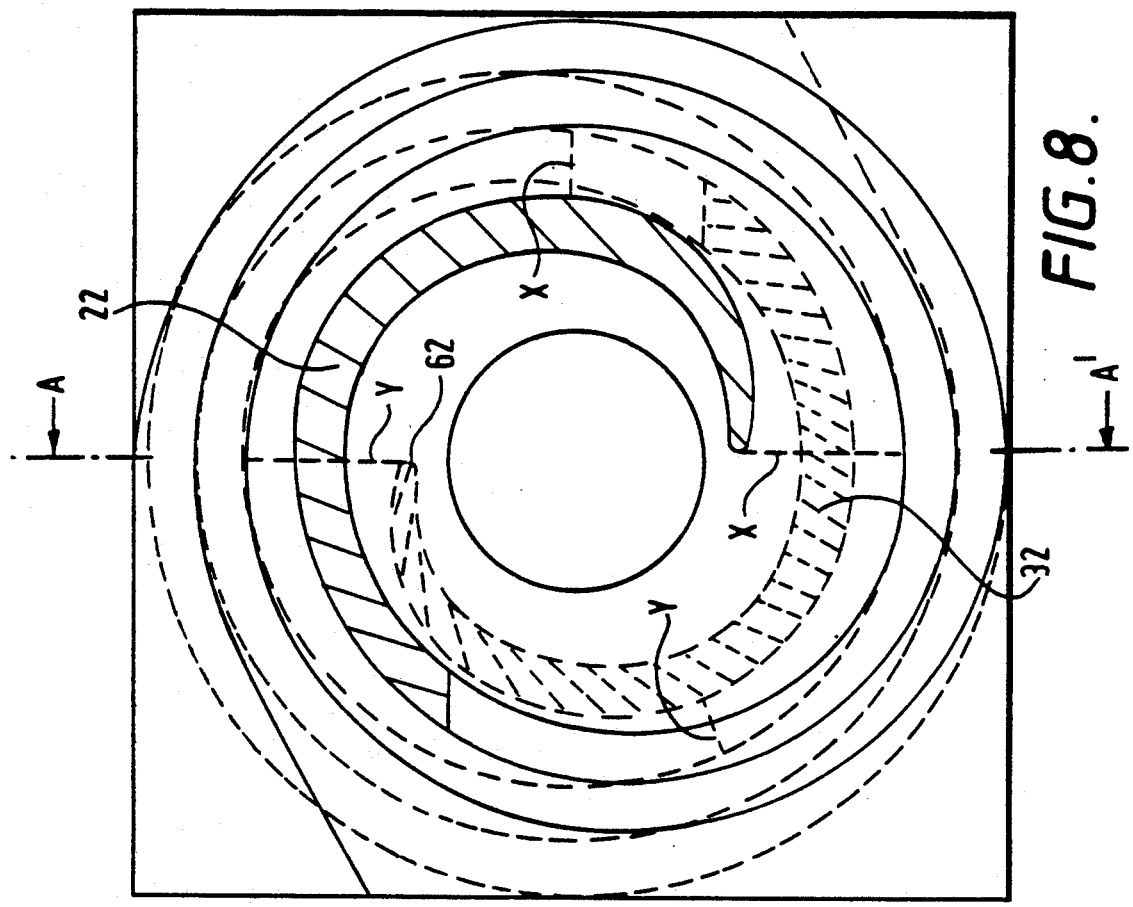
Figure 7:
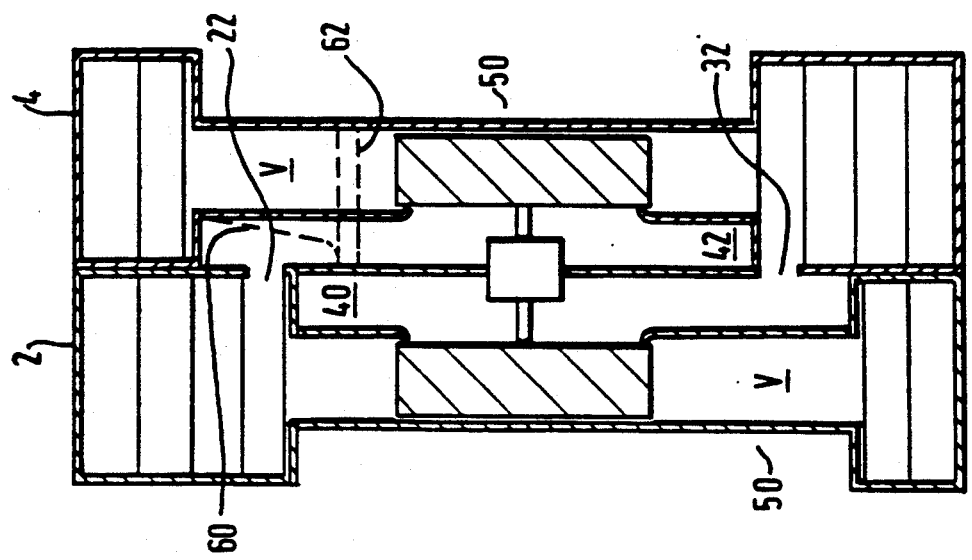

FIGS. 7 and 8 show a further embodiment respectively in schematic longitudinal and transverse cross-sections, FIG. 7 being a view along section A-A1 shown in FIG. 8.

Figure 1:
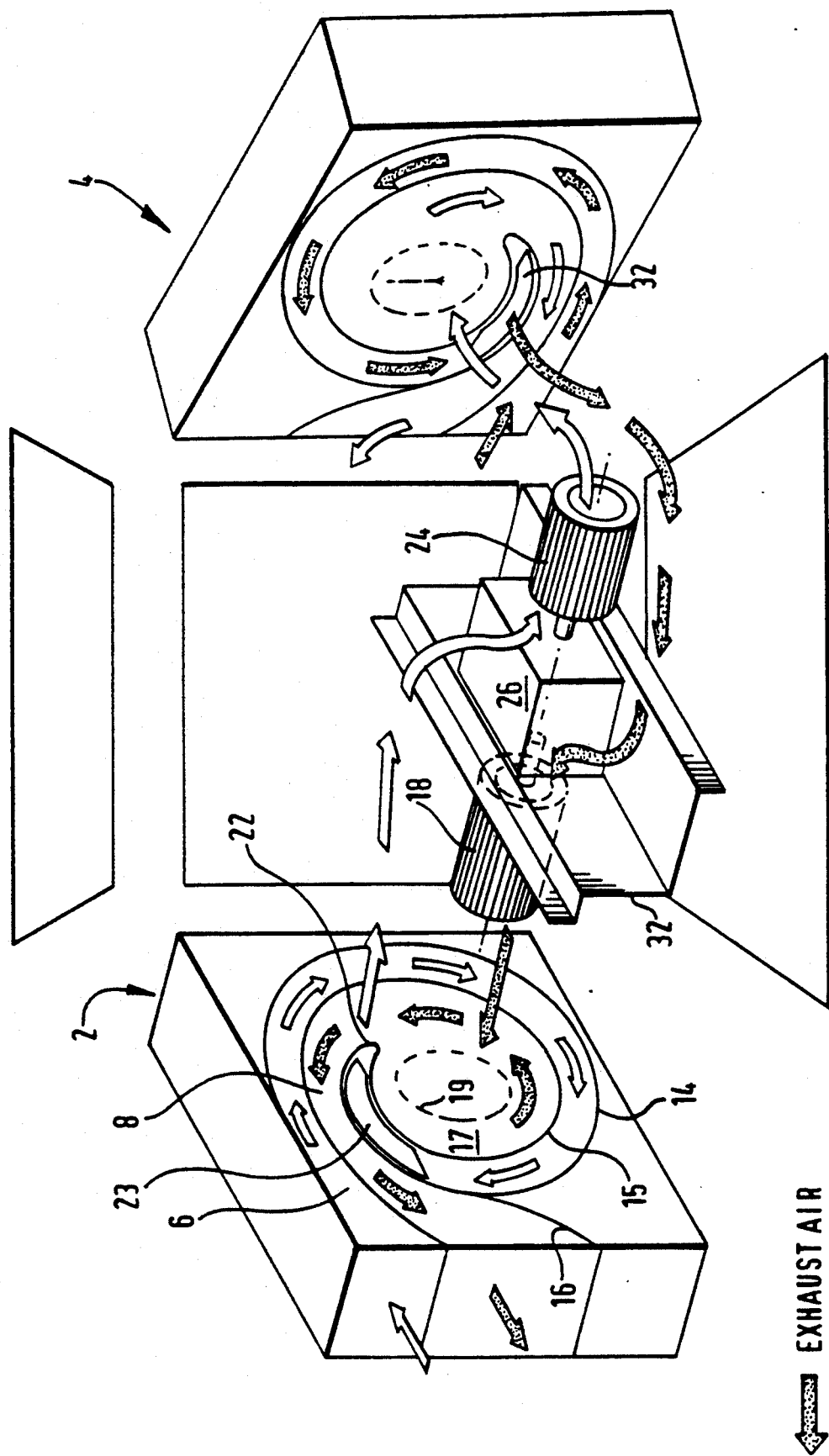
FIG. 1 is an exploded schematic view of heat exchange apparatus in accordance with the invention.
Figure 2B:
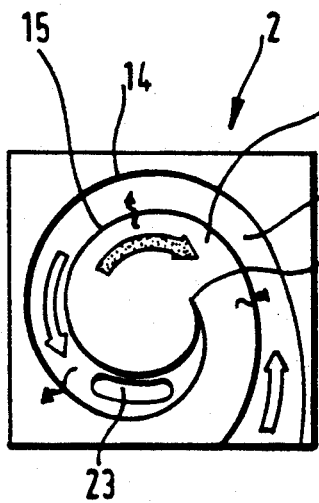
FIGS. 2a, 2b and 2c show respectively, in schematic form, a central portion and left and right end portions of heat exchange apparatus.
Figure 2A:
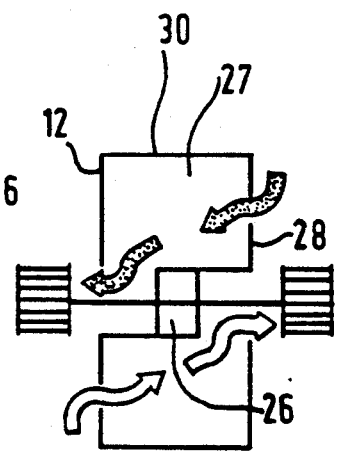
Figure 2C:
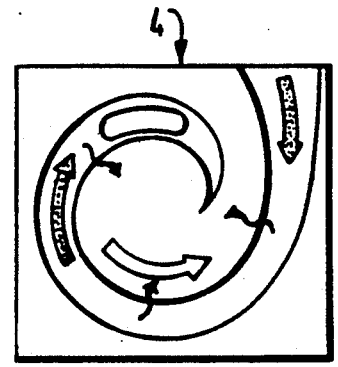
Figure 3:
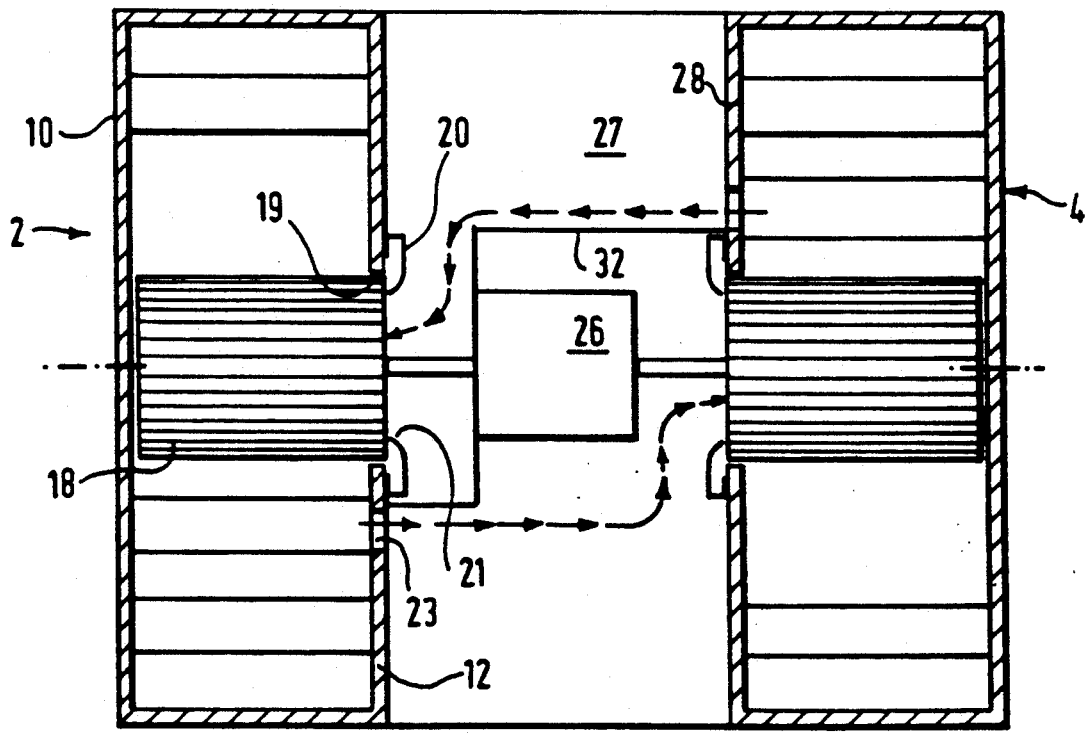
FIG. 3 is a cross-sectional view, of heat exchange apparatus.

FIGS. 1, 2 and 3 show very similar embodiments and will be described together. Throughout the drawings, like parts of different embodiments are referred to using like reference numerals.

With reference to FIGS. 1, 2 and 3, the heat exchange apparatus comprises a first heat exchange unit 2, and a second heat exchange unit 4, units 2 and 4 being arranged side by side with a space between them.

The first heat exchange unit 2 comprises two interleaved spiral flow pathways 6, 8. Each spiral pathway is bounded by parallel side walls 10, 12 (FIG. 3), suitably of a plastics material, and by a pair of flexible aluminium strips 14/15 and 15/16, set between the side walls 10, 12. The central strip 15 acts as a barrier separating the flow pathways 6 and 8, as does the strip 14 in its innermost region. In the FIG. 2 embodiment only two strips, 14, 15 are provided. As will be seen in FIG. 1, each spiral pathway extends for between one and two revolutions. The inner pathway 8 commences at an inner volute 17 within which a conventional centrifugal impeller 18 is located, the side wall 12 adjacent the impeller 18 having a circular opening 19 slightly larger than the impeller cross-section. The position of the opening 19 is shown in dotted line in FIG. 1, in which the side wall 12 is not shown. The volute 17 within the spirals is considerably larger than the opening 19. Mounted on the outside of the side wall 12 is an eye plate 20 (FIG. 3) having a circular aperture corresponding in size with and aligned with the interior cross-section of the impeller, and whose rim 21 is formed with a taper to guide air into the interior of the impeller.

The outer flow pathway 6 terminates at an end closure or blind wall 22, the aluminium strips 14, 15 coming together at this point. A nosing (not shown) may be provided, if desired, into which the ends of the strips locate. Just before the blind wall is reached, there is a transverse slot-like transfer port 23, formed in the side wall 12, providing an outlet from this flow pathway.

Arranged alongside the unit 2, but spaced apart from it, is the second heat exchange unit 4 of identical form but arranged upside down relative to the unit 2. The respective impellers 18, 24 of the first and second heat exchange units are driven by a common shaded pole motor 26 located between them.

It should be noted that the motor is within an enclosure 27 defined by opposed side walls 12, 28 of the first and second heat exchange units, and cross walls 30 therebetween. Within the enclosure, there is a stepped internal partition 32 extending between one side wall 12 and the other side wall 28, such that the opening 19 into the volute of each heat exchange unit communicates with the slot-like transfer port of the other heat exchange unit.

In use, with the motor 26 rotating both impellers 18, 24, and with the apparatus arranged, in this example, in an external wall of a building, stale interior air is drawn into the outer flow pathway 6 of heat exchange unit 2, and around the pathway to the transfer port 23, where it leaves the unit, and passes into the heat exchange unit 4 via the opening 19 into the eye thereof. From there, it passes, via the impeller 24, to the volute, at the start of the inner spiral pathway of heat exchange unit 4, along that pathway and then to the outside atmosphere. In so doing, it gives up a substantial amount of heat to the incoming air, which is drawn into the outer pathway of heat exchange unit 4, leaving this apparatus by the slot-like opening 32, passing to the volute at the start of the inner spiral pathway of heat exchange unit 2 along that pathway, and into the building.

In the embodiment of FIGS. 1 to 3, there is a pair of flow pathways in each heat exchange unit, with the apparatus being arranged so that air passes through these in opposite directions. In other embodiments there are two pairs of such adjacent pathways, with the apparatus being arranged so that air passes through adjacent pathways in opposite directions, both pathways for incoming air terminating in blind walls, and being formed with slot-like outlets adjacent the blind walls. From there, air passes into the volute of the second heat exchange unit, as described with reference to FIGS. 1 to 3, but the volute communicates with two spiral pathways which convey the air to the exterior. It will moreover be appreciated that the flow pathways may be narrower, and extend through more revolutions, that is shown by the schematic drawings, which are presented herein for the purpose of clarity. An example of a "tightly wound" spiral heat exchanger is shown in GB-A-2140549. Similarly "tightly wound" spiral configurations could be employed in the present invention.

Further pathways may be provided; for example it is quite possible to have six or more pathways in a heat exchange unit.

The manufacture of a heat exchange unit 2, 4 in accordance with the invention may be facilitated by forming the side walls 10, 12 in manufacture with appropriately shaped guides or grooves to receive thin, flexible aluminium strips (FIG. 4), suitably of about 0.25 mm thickness. For example, the side walls may be pressed or moulded into the appropriate shape. Grooves to receive the steel strips are shown as 40. Side walls 10, 12 of a heat exchange unit are in alignment with each other, as shown in FIG. 4, and the aluminium strips are fed into place by lengthwise movement. The strips follow the spiral grooves until they can travel no further, having reached the end of the grooves. In the embodiment shown, adjacent grooves meet at the innermost part of the spiral, so that when adjacent strips have been pushed into place, they abut with each other at the end of one of the pathways. Alternatively, a nosing may be provided, into which they locate.

In FIG. 5 there is shown a more compact heat exchange apparatus in which the spiral pathways, not shown in detail but generally indicated by cross-hatching, of each heat exchange unit 2, 4, extend to the centre plane of the apparatus. The motor 26 is located in a central space constituted by hollows 40, 42 defined in the units 2, 4 respectively. The hollows are aligned with—effectively axial extensions of—the volutes V of the units. The two hollows face each other but are laterally displaced from each other to a small extent and do not communicate with one another, a partition 44 being provided, around the motor 26. The partition 44 extends further out so that the spiral pathways of unit 2 are not directly in communication with spiral pathways of unit 4. However, the partition has two apertures 22, 32, at the position at which the hollows 40, 42 are displaced beyond each other. The apertures 22, 32 constitute the transverse transfer ports from spiral pathways of units 2, 4. It will thus be appreciated, and is seen in FIG. 5, that exhaust air into unit 2 passes through aperture 22 on leaving its spiral flow path and then passes into the core of the centrifugal fan of the unit 4, thence to the outflow spiral flow path of unit 4; and that the intake air into unit 4 passes through aperture 32 on leaving its spiral flow path and thence into the core of the centrifugal fan of the unit 2, thence to the outflow spiral flow path of the unit 2.

The embodiment of FIG. 5 is compact because of the elimination of the spacing between the heat change units as provided in the embodiment of FIG. 1 to 3.

FIG. 6 shows schematically a simple embodiment in which the inner pathway 8 is effectively entirely constituted by a volute of a centrifugal impeller 18, and an outer pathway 6 is for the axial passage (into the place of the paper) of, for example, air or water.

FIGS. 7 and 8 show an embodiment of heat exchange apparatus similar to the embodiment of FIG. 5, and in greater detail, showing the heat conductive barriers. It will be clearly seen from FIG. 7 that the hollows 40, 42 are axial extensions of the volutes V. FIG. 8 shows the unit 4 (whose spiral walls are shown in dotted line) arranged upside down relative to unit 2, whose spiral walls are shown in solid line, with the transfer port 32 of unit 4 aligned with a region of the volute of unit 2, and the transfer port 22 of unit 2 aligned with a region of the volute of unit 4. It will moreover be observed in FIG. 7 that each unit also has a outer-facing hollow 50, an axial extension of the volute, at its end which is remote from the other unit. The hollow 50 may receive electrical control apparatus, for example switchgear, thermostat, etc.

In FIG. 8 the region of each inner pathway between the dotted lines X (for unit 2), and Y (for unit 4) is a ramped region in which the inner pathway widens axially to compensate for the radial narrowing of the pathway as it leaves the volute, and prevent turbulence/stalling of the air. In FIG. 7, the ramp is schematically indicated by dotted lines 60 as is the nosing 62 at the end of the inner spiral pathway.

I claim:

1. Heat exchange apparatus, comprising a first heat exchange unit and a second heat exchange unit, each heat exchange unit having a fluid impeller and a heat conductive wall surrounding the impeller, wherein each said unit has a first flow pathway, surrounding the impeller, internally of the wall, and a second flow pathway, externally of the wall; the first and second units being so connected that the first flow pathway of the first unit communicates, via the impeller of the first unit, with the second flow pathway of the second unit; and the first flow pathway of the second unit communicates, via the impeller of the second unit, with the second flow pathway of the first unit.

2. Heat exchange apparatus as claimed in claim 1, wherein the wall of each unit is of spiral form thereby enclosing a volute within which the impeller of the respective unit is located.

3. Heat exchange apparatus as claimed in claim 2, wherein the first flow pathway of each unit continues beyond the volute in a spiral conformation.

4. Heat exchange apparatus as claimed in claim 2, wherein each unit comprises a second heat conductive wall of spiral form which serves as the outer wall of the second flow pathway of the respective unit.

5. Heat exchange apparatus as claimed in claim 1, wherein the first and second units are located together substantially in face-to-face contact, the first and second units defining respective hollows, which oppose each other but with a lateral offset from each other, Wherein the units have partitioning between them, the arrangement being such that the communication between the second flow pathway of the first unit and the first flow pathway of the second unit is via a transfer port in the partitioning at the position at which the second hollow extends laterally beyond the first hollow, and via the impeller of the second unit; and the communication between the second flow pathway of the second unit and the first flow pathway of the first unit is via a transfer port in the partitioning at the position at which the first hollow extends laterally beyond the second hollow, and via the impeller of the first unit.

6. Heat exchange apparatus according to claim 5, wherein the second unit is arranged upside down relative to the first unit and the said hollows are axial continuations of respective volutes of the units, wherein each transfer port is aligned with a region of the volute of the other unit.

7. Heat exchange apparatus as claimed in claim 1, wherein the impellers are driven by a common motor.

8. Heat exchange apparatus as claimed in claim 7, wherein the motor is located between the impellers.

9. Heat exchange apparatus as claimed in claim 1, adapted to exchange heat between air streams passing along respective flow pathways.

10. Heat exchange apparatus as claimed in claim 1, in situ in the external wall of the building, to exchange heat between exhaust air drawn from the interior of the building and intake air drawn from outside.

* * * * *